United States Patent [19]

Inoue

[11] Patent Number: 4,523,480
[45] Date of Patent: Jun. 18, 1985

[54] MASS FLOW ROTAMETER

[75] Inventor: Kiyoshi Inoue, Tokyo, Japan

[73] Assignee: Inoue-Japax Research Incorporated, Yokohama, Japan

[21] Appl. No.: 618,757

[22] Filed: Jun. 8, 1984

Related U.S. Application Data

[63] Continuation of Ser. No. 345,541, Feb. 3, 1982, abandoned.

[30] Foreign Application Priority Data

| Feb. 5, 1981 | [JP] | Japan | 56-16536 |
| Nov. 9, 1981 | [JP] | Japan | 56-178458 |
| Nov. 18, 1981 | [JP] | Japan | 56-183663 |

[51] Int. Cl.³ .............................................. G01F 1/24
[52] U.S. Cl. .......................... 73/861.56; 73/861.57
[58] Field of Search ........... 73/861.55, 861.56, 861.57, 73/861.48, 861.51

[56] References Cited

U.S. PATENT DOCUMENTS

| 2,452,156 | 10/1948 | Schover | 73/861.56 X |
| 3,128,625 | 4/1964 | Heineman | 73/861.56 |
| 3,380,295 | 4/1968 | Bento | 73/861.56 X |
| 3,416,371 | 12/1968 | Locke | 73/861.57 |
| 3,522,731 | 8/1970 | Wilson | |
| 3,623,365 | 11/1971 | Lowell et al. | 73/861.56 |
| 3,699,560 | 10/1972 | Meunier et al. | 73/861.56 X |
| 4,312,240 | 1/1982 | Hermanns | 73/861.57 |
| 4,335,618 | 6/1982 | Bucsky et al. | 73/861.56 |

FOREIGN PATENT DOCUMENTS

| 1648098 | 5/1971 | Fed. Rep. of Germany . |
| 865705 | 5/1941 | France . |
| 2441832 | 6/1980 | France . |
| 492202 | 7/1970 | Switzerland . |
| 1135394 | 12/1968 | United Kingdom . |

OTHER PUBLICATIONS

"Measure Mass Flow with a Rotameter", *Control Engineering*, W. Buzzard, Mar. 1966.

*Primary Examiner*—Charles A. Ruehl
*Assistant Examiner*—Brian R. Tumm
*Attorney, Agent, or Firm*—Karl F. Ross; Herbert Dubno

[57] ABSTRACT

A flow meter is provided using a fluid responsive solid member which is introduced into a flow chamber defined in a vertically standing tubular housing and which, with the flowing fluid supplied through an inlet at the lower end of the housing and discharged through an outlet at the upper end of the housing, is propelled to a level as a function of the volume rate of flow of the fluid within the chamber. The solid member is composed at least in part of an electromagnetically susceptible material and an electrically conductive winding is disposed in an electromagnetically inductive relationship with that member to present a reactance which varies as a function of the position of the member in the flow chamber.

3 Claims, 23 Drawing Figures

MASS FLOW ROTAMETER

This application is a continuation of application Ser. No. 345,541, filed Feb. 3, 1982, now abandoned.

FIELD OF THE INVENTION

The present invention relates to a fluid flow meter in general and concerns, in particular, a new and improved device for measuring the flow rate of a fluid as well as a method of its measurement utilizing a floating or fluid-flow responsive member.

BACKGROUND OF THE INVENTION

Fluid flow meters utilizing a floating member have been known. In these known devices, a glass tubular casing constituting a fluid conduit is disposed vertically, and a fluid to be measured is introduced through an inlet pipe provided at its lower end and is discharged through an outlet pipe provided at its upper end. A float is disposed in the casing and is displaceable therein in an amount determined by the volume rate of flow of the fluid passing through the conduit. In these devices, suitable flow rate indicia are provided to enable the flow rate to be visually read or, alternatively or in addition, an optical sensor is provided to optically sense the index or measure the position of the float in the flow meter casing whereby to indicate the fluid flow rate. Inconveniently, these devices are subject to measurement errors when dust obscures the optical path and further requires bothersome maintenance to quite a degree to ensure that the glass flowmeter casing is at all times kept clean; hence they cannot be practically serviced in environments subject to contamination or pollution. Furthermore, the devices of indicia type tend to suffer visual reading errors and themselves cannot be used for the purposes of controlling the fluid flow itself or associated equipments. The devices with an optical sensor require relatively complex structures and hence are expensive to manufacture, and their cost is greater where the aforesaid maintenance problems are taken into account.

OBJECTS OF THE INVENTION

It is accordingly an important object of the present invention to provide a flow meter which is relatively simple and inexpensive, and yet is practically immune to enviromental pollution or contamination and free from measurement errors.

Another object of the invention is to provide a novel and improved method of measuring the flow rate of a fluid, which requires only relatively simple equipment which is inexpensive and easy to maintain yet is capable of affording due measurement precision and of providing a measurement signal that can be used for a control purpose.

SUMMARY OF THE INVENTION

In accordance with the present invention, there is provided a fluid flow meter or device for the measurement of the flow rate of a fluid, which comprises: a vertically standing tubular housing with a lower end and an upper end defining a flow chamber for the fluid to be measured; a fluid inlet connected to the lower end; a fluid outlet connected to the upper end; a fluid responsive solid member disposed movably within at least a portion of the chamber, the member being composed at least in part of an electromagnetically susceptible material and having a density greater than the density of the fluid to be measured but vertically propellable with the flowing fluid within the chamber up to a level as a function of the rate of flow of the fluid through the chamber; and electrically conductive winding disposed in an electromagnetically inductive relationship with the said solid member, and so arranged and energizable by a power supply as to present an inductive reactance variable as a function of the level of the fluid responsive member within the chamber; and circuit means for sensing an electrical magnitude (e.g. voltage or current) representing the value of the said reactance that varies.

The invention also provides a method of measuring the flow rate of a fluid, which method comprises the steps of: disposing a fluid responsive member movably within at least a portion of the flow chamber defined by a vertically standing tubular housing having a lower end connected to a fluid inlet and an upper end connected to a fluid outlet, the said solid member being composed of at least in part of an electromagnetically susceptible material and having a density greater than the density of the fluid to be measured; passing the fluid to be measured through the flow chamber to propel said solid member within the chamber up to a level as a function of the rate of flow of the fluid through the chamber; disposing an electrically conductive winding in an electromagnetically inductive relationship with the said solid member in such a manner that the winding, when energized by a power supply, presents an inductive reactance variable as a function of the level of the flow responsive member within the chamber; and sensing an electrical magnitude representing the value of the said reactance to indicate the fluid flow rate.

BRIEF DESCRIPTION OF THE DRAWINGS

These and other objects and features of the present invention as well as advantages thereof will become more readily apparent from the following description of certain preferred embodiments thereof made with reference to the accompanying drawings in which.

SPECIFIC DESCRIPTION

Figure 1:
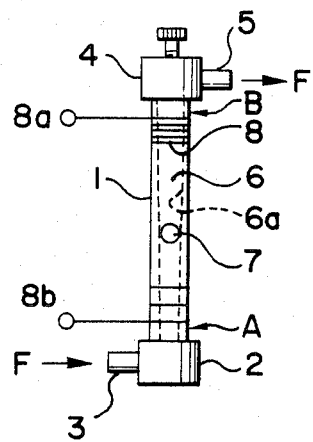
FIG. 1 is an elevational front view, partly in section, diagrammatically illustrating a portion of a fluid flow meter according to the invention.

Referring first to FIG. 1, a flow meter of the invention shown includes a vertically standing tubular housing 1 composed of an electromagnetically nonsusceptible material such as glass, ceramic or synthetic resin. Conveniently, the housing 1 is transparent and may be composed of a transparent electrically and magnetically nonconductive material (e.g. glass) and, if not so composed itself to be transparent, may be formed with an elongate window extending longitudinally and fitted with a transparent material to allow viewing. The tubular housing 1 has at its lower end a fluid inlet chamber 2 connected with an inlet pipe 3 and at its upper end a fluid outlet chamber 4 connected with an outlet pipe 5 and defines a fluid flow chamber 6 between the inlet and outlet chambers 2 and 4. The tubular housing 1 is supported rididly or upright by support member (not shown) to maintain its vertical position. A fluid F to be measured is introduced through the inlet pipe 3 into the inlet chamber 2, passes through the flow chamber 6 and is discharged through the outlet chamber 4 into the outlet pipe 5. A needle valve is shown arranged at the upper outlet chamber 4 to regulate flow resistance of the fluid F. The inner wall 6a of the tubular housing 1 defining the flow chamber 6 is here tapered so as to upwardly diverge and increase in cross section.

Figure 15:
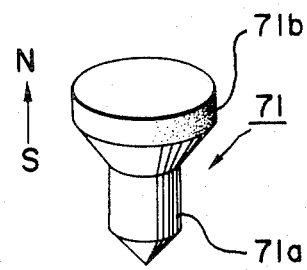
FIG. 15 is a perspective view illustrating the fluid responsive member of the invention in a bullet form similar to that shown in FIG. 8.
Figure 16:
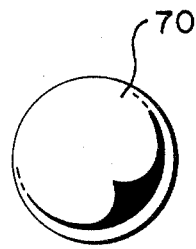
FIG. 16 is a perspective view illustrating the fluid responsive member of the invention constructed in the form of a spherical ball.

Disposed in the flow chamber 6 is a fluid responsive solid member 7 which may be in the form of a spherical ball as shown and as is also illustrated at 70 in an enlarged view in FIG. 16. The fluid responsive member 7 may also be in the form of a bullet shown at 71 in FIGS. 8 and 15. In accordance with an important feature of the invention, the member 7 is constructed to have a density greater than the density of the fluid F to be measured so that it gravitates to the bottom of the chamber 6 as long as there is no flow of the fluid F therein but, with a flow of the fluid F, is propelled by the flowing fluid F against gravity and displacing upwards in an amount proportional to or, more generally, to a level or height which varies as a function of, the rate of flow of the fluid F in the chamber 6.

Figure 8:
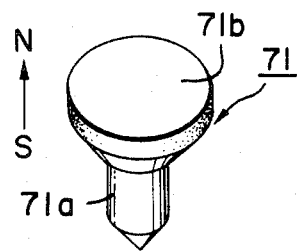
FIG. 8 is a perspective view of a fluid responsive member constructed in a bullet form which may be used with the fluid flow chamber in a flow meter according to the invention.

In accordance with a further important feature of the present invention, the fluid responsive member 7 is composed at least in part of an electromagnetically susceptible or inductive material, viz. of a magnetic material such as soft iron or a ferrite, or else of an electrically conductive non-magnetic material, e.g. aluminum. The magnetic material may also be an aluminum-nickel-cobalt alloy, iron-chromium-cobalt alloy, a rare-earth magnetic alloy (e.g. Sm-Co, Pr-Co or Pr-Sm-Co alloy), platinium-cobalt alloy or any other magnetic material or permalloy. The magnetic material may either be a cast or sintered permanent magnetic material or a material of high permeability such as a iron-silicon-aluminum material or permalloy. The member 7 may be a solid body composed uniformly of such a magnetic or electrically conductive material, or otherwise may contain any other suitable material to adjust its density. Thus, a solid body of magnetic or electrically conductive material embedded as a core in a wear-resistant material such as a ceramic, carbon, metal or tetrafluoroethylene, or coated with such a wear-resistant material. The fluid responsive member 7, of a bullet form 71 as shown in FIGS. 8 and 15, may advantageously have a base portion 71a composed of a non-magnetic and/or electrically nonconductive material such as a ceramic, carbon, tetrafluoroethylene or a synthetic resin and a head disk 71b composed of a magnetic and/or electrically conductive material. In FIGS. 8 and 15, a member 71 with a head disk 71a magnetized across its thickness is shown.

Further, the tubular housing 1 is shown as having an electrically conductive winding 8 wound therearound to form a coil extending across a length thereof. The winding 8 has its coil pitch preferably varying progressively along the length of the tubular housing 1, viz. progressively reduced upwardly as shown or alternatively increased upwardly. It is essential that the winding 8 be disposed in an electromagnetically inductive relationship with the fluid responsive solid member 7 in the chamber 6. The winding coil 8 need not be wound around the outer surface of the housing 1 and may be constructed and arranged in any of various forms as described hereinafter in connection with several FIGURES which follow. The winding 8 may also be composed of a semi-transparent electrically conductive material not to obstruct viewing of the fluid responsive member 7 in the chamber 6 or reading of indicia when provided on the outer or inner wall of the housing 1.

Figure 2:
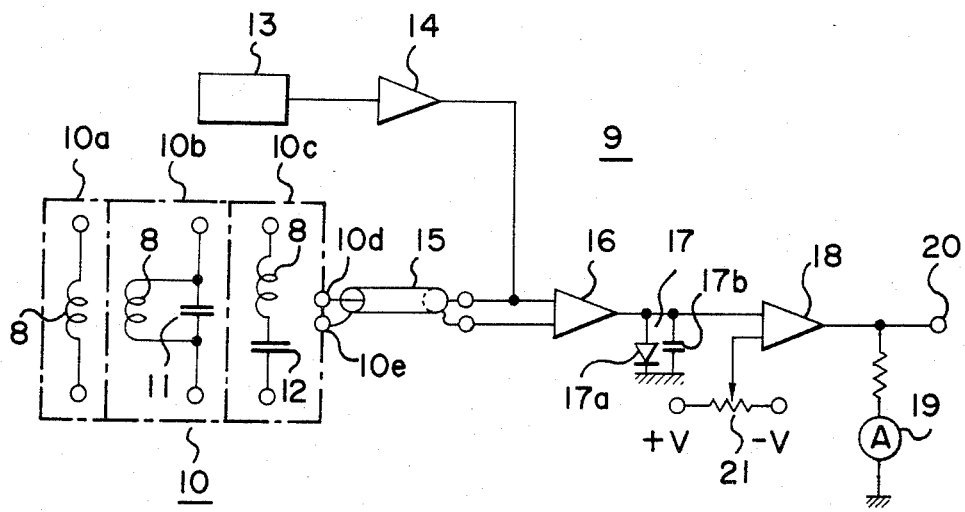
FIG. 2 is a circuit diagram illustrating electrical sensing circuits of the fluid flow meter of the invention.

The winding 8 has a pair of terminals 8a and 8b leading from an electrical sensing circuit 9 as shown in FIG. 2. The winding 8 is so arranged, when energized by a power supply, as to present an inductive reactance which varies as a function of the level of the fluid responsive member propelled with the flowing fluid F and hence of the rate of flow of the fluid in the flow chamber 6.

Referring to FIG. 2 which shows an embodiment of the electrical sensing circuit which presents an electrical magnitude, e.g. voltage or current, representing the value of the inductive reactance of the winding 8 which varies, the winding 8 is shown as connectable in one of three alternative reactance circuits 10a, 10b and 10c to a pair of input/output terminals 10d and 10e of the sensing system 9. The reactance circuit 10a is constituted by the winding 8 alone, the reactance circuit 10b comprises a parallel resonant circuit constituted by the winding 8 and a capacitor 11 connected in parallel therewith and the reactance circuit 10c comprises a series resonant circuit constituted by the winding 8 and a capacitor 12 connected in series therewith. When the winding 8 is energized by a high-frequency signal applied from an oscillator 13 via an amplifier 14, cables 15 and terminals 10d and 10e, there develops across the terminals 10d and 10e an electrical signal which represents the inductive reactance of the winding 8 that varies as a function of the propelled position of the fluid responsive solid member 7. The circuit 10a may be selected to provide a voltage signal which represents the voltage across or the current through the winding 8 varying with the inductive reactance thereof. The circuit 10b may be used to provide a voltage signal which represents the voltage across or current through the parallel resonant circuit whose resonant frequency varies with the inductive reactance of the winding 8 included therein. The circuit 10c may be chosen to provide a voltage signal which represents the voltage across or current through the series resonant circuit whose resonant frequency varies with the inductive reactance of the winding 8 connected therein.

The high-frequency voltage signal of any one of these reactance circuits 10a, 10b and 10c, when in use for operation, is applied to an operational amplifier 16 for signal stabilization and amplification. The amplified high-frequency output signal of the amplifier 16 is applied to an integrating circuit 17 comprising a diode 17a and a capacitor 17b and is thereby converted to a continuous DC voltage which feeds into a DC amplifier 18. An indicator 19 is connected to the output of the amplifier 18 to indirectly indicate the fluid flow rate in the chamber 6 through a voltage or current signal sensed at the amplifier output or to directly indicate the flow rate converted from the sensed signal, and is shown by an ammeter. An optional output terminal 20 may be provided for applying the latter signal to a fluid flow regulation system or any required control system associated with the fluid flow. A zero-point adjustment for the indicator 19 is made through a reference input 21 to the DC amplifier 18. The cables 15 connecting the reactance circuit 10 disposed in direct proximity to the tubular housing 1 and to the sensing circuit 9 are shown as utilizing a coaxial cable.

EXAMPLE

A cylindrical tubular housing 1 is made of glass and has its outer cylindrical wall of a diameter of 9 mm and, for defining a flow chamber 6, an inner wall 6a tapered to diverge upwardly and having a diameter of 6.5 mm at a lower end portion and a diameter of 7.5 mm at an upper end portion of the housing 1. A copper conductor of a diameter of 0.1 mm is wound with 80 turns around the housing across those end portions which have a distance of 60 mm so as to form a coil 8 having its winding pitch of 2 mm at the lower end portion progressively reduced to 0.3 mm at the upper end portion. A spherical ball composed of a ferrite for high-frequency uses and having a diameter of 6.35 mm is put in the flow chamber 6 to serve as a float or fluid-responsive member 7 and the coil 8 is energized by a high-frequency AC or periodic DC signal of a frequency of 1 MHz. As the fluid to be measured, a nitrogen gas is supplied at a pressure of 0.5 kg/cm$^2$ and caused to flow through the flow chamber 6 at varying volume rates of flow propelling the float up to varying heights therein. As the float displaces upwards, the coil 8 has its inductive reactance to the input signal varied proportionally to the amount of displacement and has an inductance of 8.0 $\mu$H when it locates at the lowermost position and 8.3 $\mu$H when it locates at the uppermost position.

Figure 3:
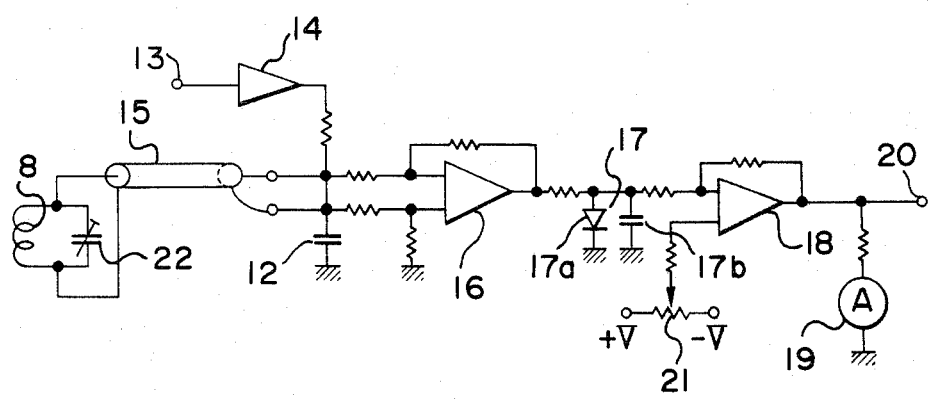
FIG. 3 is a circuit diagram illustrating another electrical sensing circuit for use in the practice of the invention.

FIG. 3 shows a modification of the electrical sensing system show in FIG. 2 and which uses same reference numerals to designate same components as used therein. In this modification, the series resonant reactance circuit 10c shown in FIG. 2 is constituted with the coil 8 in the region of the tubular housing 1 and the capacitor 12 in the sensing circuit 9 which is connected thereto via the coaxial cable 15 extending over a distance. In this embodiment, a variable capacitor 22 is connected across the coil 8 for fine adjustment of the resonant frequency of the circuit 10c. Here again, the source 13 may provide a high-frequency input signal of a frequency of 1 MHz to the reactance circuit 10c including the capacitor 12 which may have a capacitance of 1000 pF.

Figure 4:
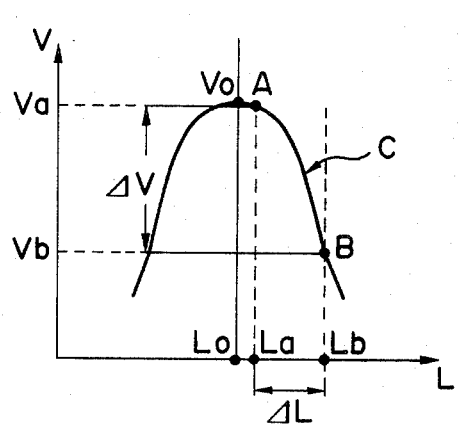
FIG. 4 is a graph illustrating a relationship between the inductive reactance of a coil and the voltage measured at a portion of the circuit shown in FIG. 2 or 3.

In the graph of FIG. 4, the terminal voltage V of the capacitor 17b constituting the integrating circuit 17 in the system of FIG. 3 is plotted along the ordinate and the inductive reactance L of the coil 8 is plotted along the abscissa. As the graph shows, a resonant condition is established with the circuit 10c when the coil 8 has inductance Lo, providing a maximum voltage Vo. The circuit is adjusted so that the coil 8 has an inductance La, slightly in excess of Lo, when in the absence of fluid flow in the flow chamber 6, the float 7 remains at the lowermost operating position A in FIG. 1. The initial inductance La equals to 8.0 $\mu$H in Example above. The graph shows that as the float 7 moves from the lowermost position A to the uppermost operating position B, entailing a change in inductance $\Delta$L from La to Lb, the voltage changes from Va to Vb along the curve C. In example above, Lb equals to 8.3 $\mu$H and $\Delta$L thus equals to 0.3 $\mu$H. With this overall change in inductive reactance $\Delta$L, the capacitor 17b provided voltage difference $\Delta V = Va - Vb$ equal to 2.5 volts. The capacitor 17b had a capacitance of 3000 pF.

Figure 5:
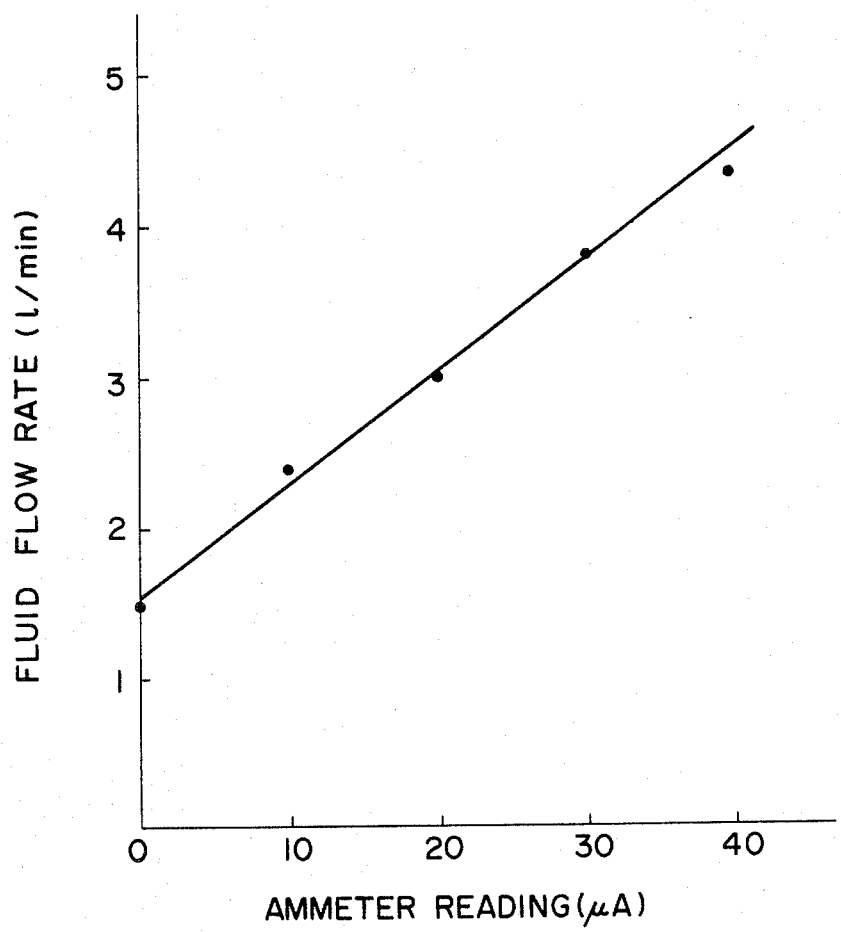
FIG. 5 is a graph illustrating a relationship between the rate of flow of a fluid passing through the flow chamber of FIG. 1 and the electric current measured at an ammeter shown in FIG. 2 or 3.

FIG. 5 shows a graph in which the volume flow rate (l/min) of nitrogen gas F at pressure of 0.5 kg passing through the flow chamber 6 is plotted along the ordinate and the reading of the ammeter 19 ($\mu$A) is plotted along the abscissa. It is seen that the reading is provided which linearly changes with the flow rate.

In the use of the flowmeter of the invention, with a fluid F continuously passing through the flow chamber 6, the input signal may be applied continuously from the signal source 13 to provide continuous monitoring of the flow rate. It is also possible to periodically connect the signal source 13 to the sensing circuit 9 to enable monitoring at a predetermined time interval. The source 13 may also be connected to the sensing circuit 9 temporarily to execute monitoring selectively when a requirement arises.

Figure 9:
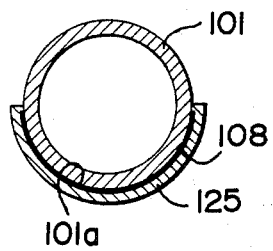
FIG. 9 is a cross-sectional view of the fluid flow chamber and the coil in the device of FIGS. 6 and 7.
Figure 6:
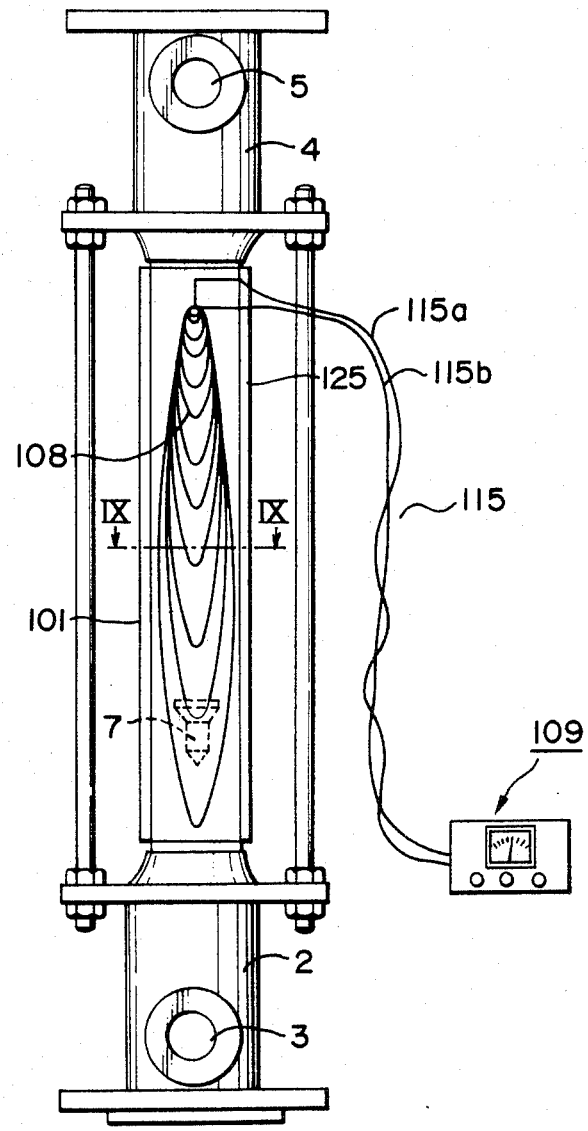
FIG. 6 is a side elevational view, partly in perspective, diagrammatically illustrating a fluid flow meter constructed in another form.
Figure 7:
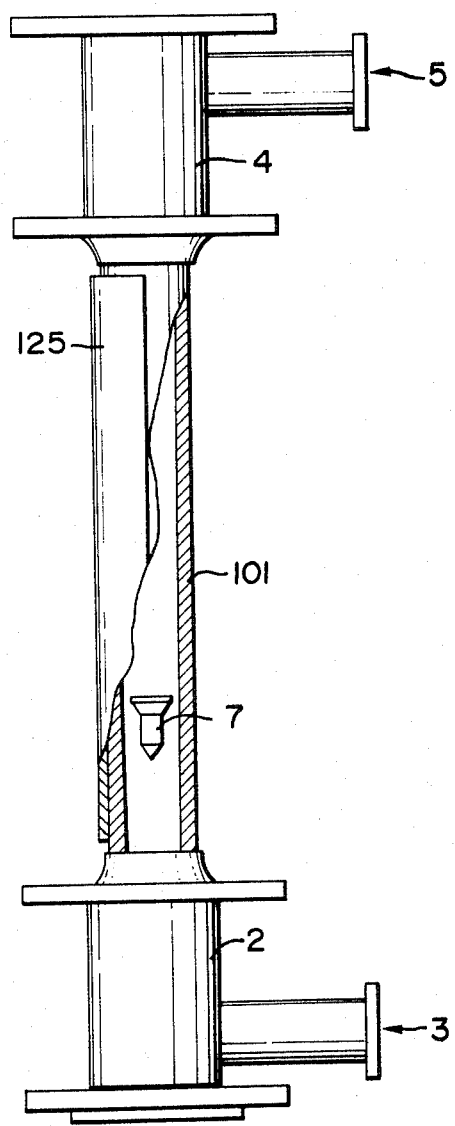
FIG. 7 is a front elevational view, partly broken away, of a portion of the flow meter of FIG. 6.

Referring to FIGS. 6, 7 and 9 in which the same reference numerals are used to designate components functionally similar to those in FIG. 1, there is shown another embodiment of the invention including a modified form of the reactance winding applied on the outer wall of a tubular housing 101 in electromagnetic inductive relationship with the fluid responsive member 7 in the flow chamber 6. In this embodiment, the reactance winding is constituted by a conductor 108 applied by a printed-circuit technique on a supporting flexible board 125 composed of, say, a synthetic resin, which is in turn applied on the cylindrical outer wall 101a of the tubular housing 101 to cover the entire area or, as shown in FIGS. 7 and 9, a semi-cylindrical area or a portion of the cylindrical surface extending longitudinally of the tubular housing 101 and bonded thereto so that the conductor 108 lies between the board 125 and the outer wall 101. The conductor 108 is applied by printing to the board 125 to form a planar spiral coil extended longitudinally downwards and having its coil pitch progressively increased downwardly, thus progressively reduced in the direction upward. In the state in which the printed board 125 is applied on the tubular housing 101, the planar spiral coil 108 is deformed to partially surround the path of the fluid responsive member 7 in the flow chamber 6 and placed in an adequate electromagnetically inductive relationship with the member 7. The two ends of the conductor 108 are connected via the respective leads 115a and 115b constituted as a coaxial cable 115 to an electrical sensing circuit 109 shown packaged as a meter unit.

Two conductors 108 patterned identically in the spiral form shown may be applied on the respective boards 125 and, upon applying these boards one upon the other on the outer wall 101a of the tubular housing 101, may be connected in series. This provides a reactance winding assembly of a greater reactance change.

The fluid responsive member 7 in the system of FIGS. 6 and 7 is shown to be a bullet form 71 as illustrated in FIG. 8 and already described but may be of any other suitable form such as a spherical ball illustrated in FIG. 16 and already described.

Figure 10:
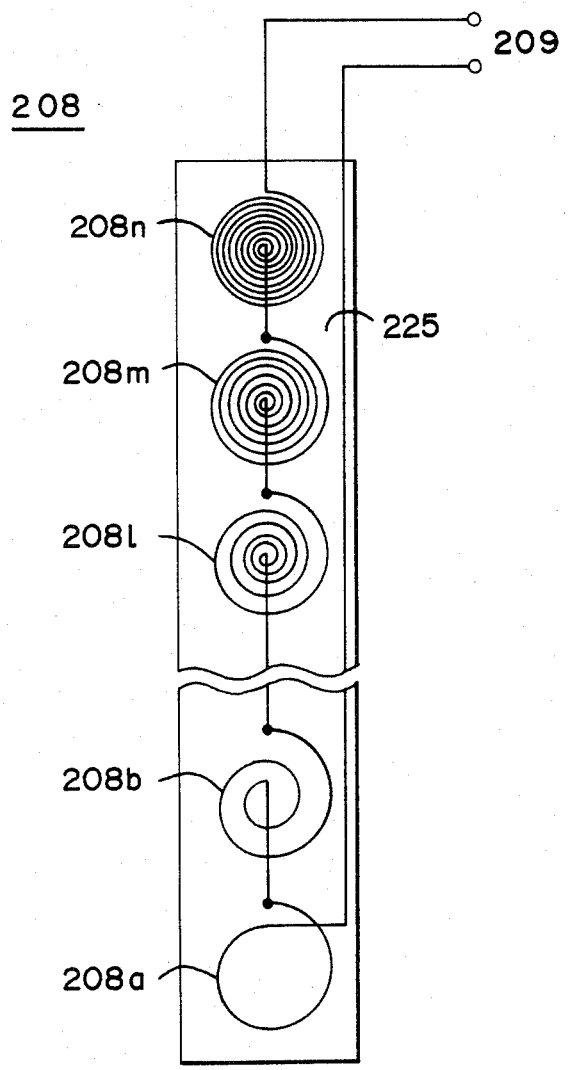
FIG. 10 is a diagrammatic elevational view illustrating another form of the coil applied to the fluid flow chamber in a device of the invention.

FIG. 10 shows a modified pattern of the reactance winding 208 printed on a printed-circuit board 225 to be applied on the tubular housing in a manner as above described. In this modification, the winding 298 comprises a plurality of spiral coils 208a, 208b, ..., 208l, 208m and 208n arranged in series in the longitudinal direction of the housing 101 and is connected in series to an electrical sensing circuit 209. It is seen that each of these coils is constructed to have a greater number of turns than the adjacent coil lying just below it.

The electrical sensing circuit shown at 109, 209 in FIG. 6 and FIG. 10 makes use of the principles already described in connection with FIGS. 2 and 3 and may also be described with reference to FIGS. 11 and 12.

Figure 11:
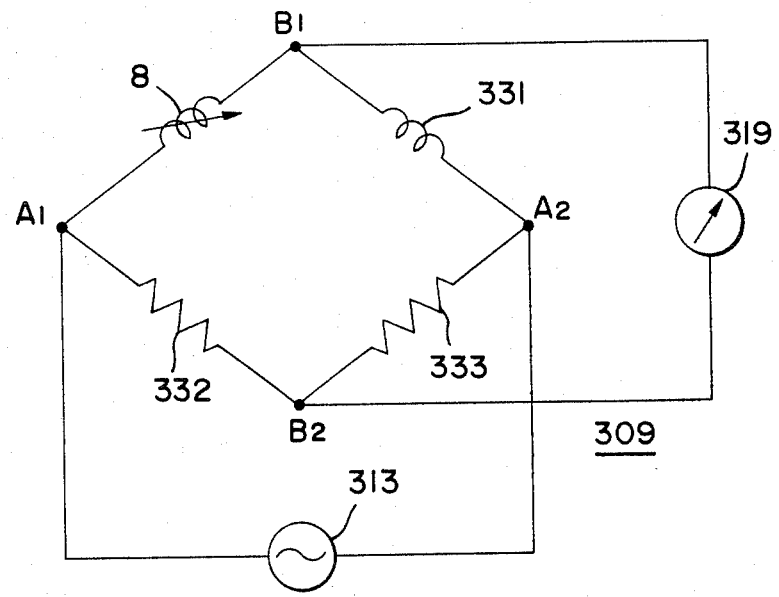
FIG. 11 is a circuit diagram of an electrical sensing circuit for use in a device of the invention.
Figure 12:
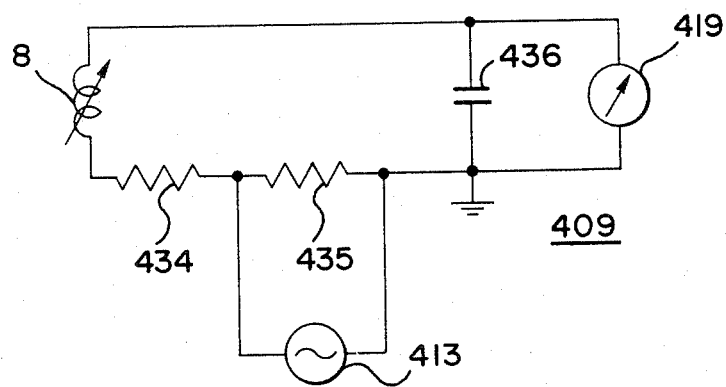
FIG. 12 is a circuit diagram of another electrical sensing circuit for use in a device of the invention.

In the circuits 309 and 409 of FIGS. 11 and 12, the reactance winding 8 refers to the one shown in FIG. 1 and or to any of the winding of other suitable patterns as shown at 108, 208 in FIGS. 6 and 10.

In the circuit 309 of FIG. 11, the winding 8 is connected with an inductor 331 and resistors 332 and 333 to form a Maxwell bridge energized by the output of an AC source of oscillator 313 which is applied across the junction A1 between the reactance winding 8 and the resistor 332 and the junction A2 between the inductor 321 and the resistor 333. An ammeter 319 is connected across the junction B1 between the reactance winding 8 and the inductor 331 and the junction B2 between the resistors 332 and 333. When the reactance of the winding 8 changes by δL, there flows between the junctions B1 and B2 an electric current proportional to δL which is read by the ammeter 319 in terms of the electric current itself or the rate of flow of the fluid in the flow chamber causing the change δL as already described.

In the circuit 409 of FIG. 12, a serial circuit of the reactance winding 8, a resistor 434 and a resistor 435 is connected in series with a capacitor 436 and with a voltmeter 419 connected in parallel with the latter. The resistor 434 represents a resistance component R of the winding 8 and the resistor 435 makes use of a non-inductive resistance Ro which is much less than R. A high-frequency oscillator or AC source is connected across the resistor 435 to develop a high-frequency voltage of small magnitude thereacross which is supplied to the LC tuning circuit constituted with the reactance 8 and the capacitor 436. The capacitance C of the capacitor 436 is adjusted so that the LC circuit resonates when the float or fluid responsive member is located at an uppermost position in the flow chamber. The capacitor 436 has thus its terminal voltage E in the resonance state:

$$E = (Io/\omega C) = (Ro/\omega CR)$$

where Io is resonant current and $\omega$ is resonant frequency. As the reactance of the coil 8 is reduced, the current I passing through the LC circuit decreases and the capacitor terminal voltage E diminishes. The voltmeter 419 is used to measure the voltage E and hence the flow rate.

Figure 13:
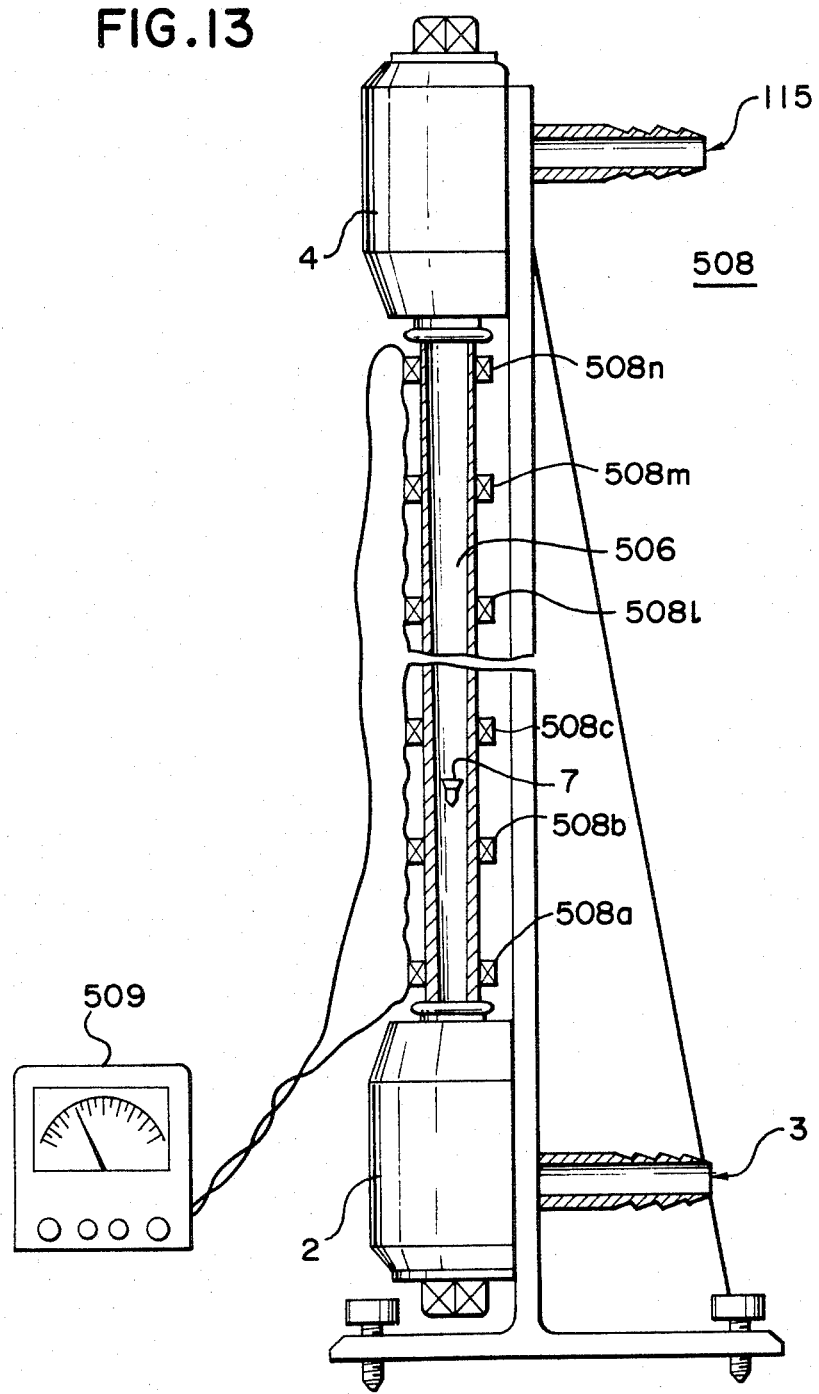
FIG. 13 is an elevational front view, partly in section, diagrammatically illustrating a flow meter of the invention utilizing a plurality of reactance coils connected in series and positioned around the fluid flow housing at different heights corresponding to indicia of the fluid flow rate.

The further form of the flow meter according to the invention shown in FIG. 13 makes use of an electrically conductive winding 508 constituted with a multiplicity of coils 508a, 508b, 508c, ..., 508l, 508m and 508n connected in series with an electrical sensing system 509 of the type already described, these coils being located at the respective positions in the direction of length of the flow-meter chamber 506 which correspond to the indicia of the volume flow rate of fluid passing through the chamber 506. In this embodiment as well, the flow chamber 506 is shown tapered to diverge upwards and the coils have their number of turns which increases as their position steps up. Thus, each coil has its number of turns greater by a number than that of the coil which locates directly therebelow.

Figure 14:
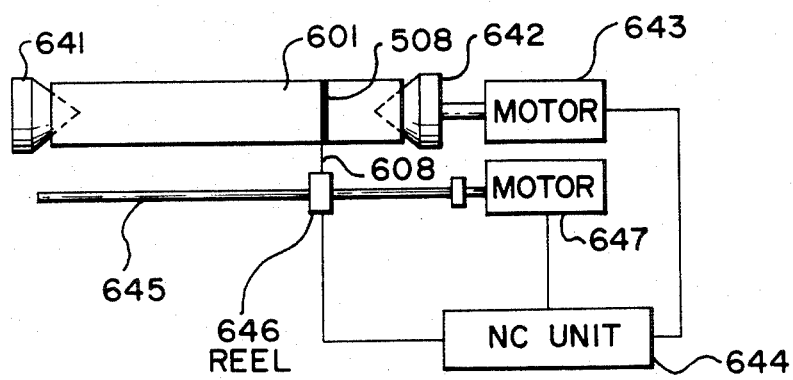
FIG. 14 is a side view diagrammatically illustrating an apparatus for automatically winding a reactance coil or coils around the tubular flow housing in the process of preparing a fluid flow meter according to the invention.

In FIG. 14 there is shown an apparatus for accurately winding an electrical conductor 608 on the outer wall of a cylindrical tubular housing 601 to form an electrically conductive reactance winding 508 disposed in an electromagnetically inductive relationship with a fluid responsive member 7 as shown in FIGS. 15 and 16 in the fluid flow chamber 506. In the apparatus shown, the tube 601 is rotatably supported between a pair of support members 641 and 642 and is rotated about its axis by a motor 643, e.g. stepping motor, controlled by a numerical control (NC) unit 644. A carriage 645, e.g. a lead screw, which carries a reel 646 of the conductor 608 is arranged to extend in parallel with the tube 601 and is rotationally driven to displace the reel 646 thereon by a motor 647, e.g. stepping motor, controlled by the NC unit 644. The latter has preprogrammed therein the positions of indicia on the flow chamber 506 of the rates of fluid flow actually measured and the number of a coil to be wound therearound at each of those positions. The preprogramed position and coil number signals in the NC unit 644 are converted into the corresponding drive signals respectively for the motors 646 and 643 to displace the reel 646 on the carriage 645 and to rotate the tube 601 so that the conductor 608 drawn out from the reel 646 is wound around the tube 601 to form the desired winding 508 thereon.

Figure 17:
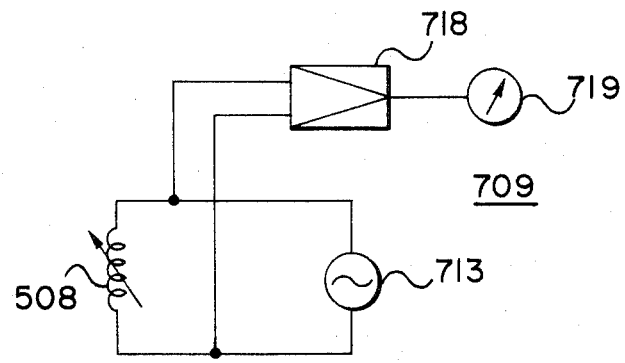
FIG. 17 is a circuit diagram of an electrical sensing system in a device of the invention utilizing a voltmeter.
Figure 18:
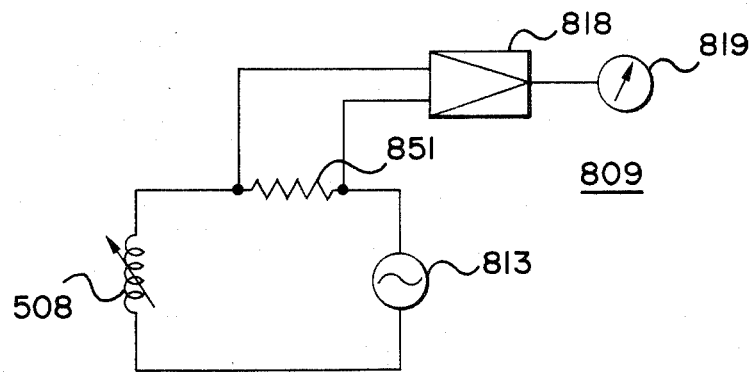
FIG. 18 is a circuit diagram of an electrical sensing system in a device of the invention utilizing an ammeter.
Figure 19:
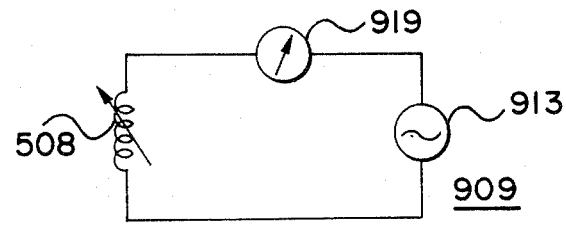
FIG. 19 is a circuit diagram of another electrical sensing system in a device of the invention utilizing an ammeter.

FIGS. 17, 18 and 19 show simplified diagrams of three different electrical circuits 709, 809, 909 which may embody the electrical sensing system 509. In the current 709 of FIG. 17, the reactance winding 508 is energized by a high-frequency oscillator or AC source 713 of a stabilized voltage so that its terminal voltage representing its inductive reactance responsive to the position of the flow responsive member 7 in the flow chamber 506 is amplified by a voltage amplifier 718 and measured by a voltmeter 719. In the circuit 809 of FIG. 18, the reactance winding 508 is connected with the oscillator or AC source 813 in series with a resistor 851. The current through the winding 508 representing its inductive reactance responsive to the position of the member 7 in the flow chamber 506 is sensed across the resistor 851, amplified by a current amplifier 818 and measured by an ammeter 819. In the circuit 909 of FIG. 19, the reactance winding 508 is shown as connected directly with an ammeter 919 in series with an oscillator or AC source 913.

Figure 20:
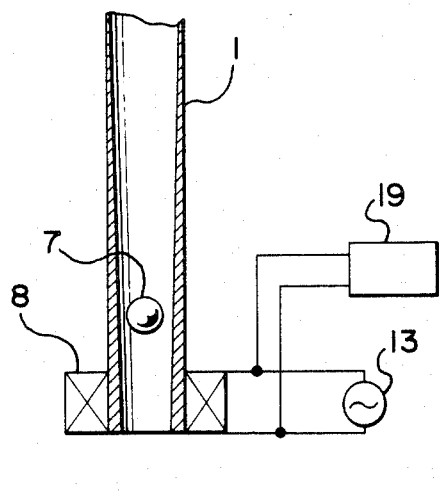
FIG. 20 is an elevational view diagrammatically illustrating a flow meter of the invention having a coil wound around the tubular housing at a lower end thereof.
Figure 21:
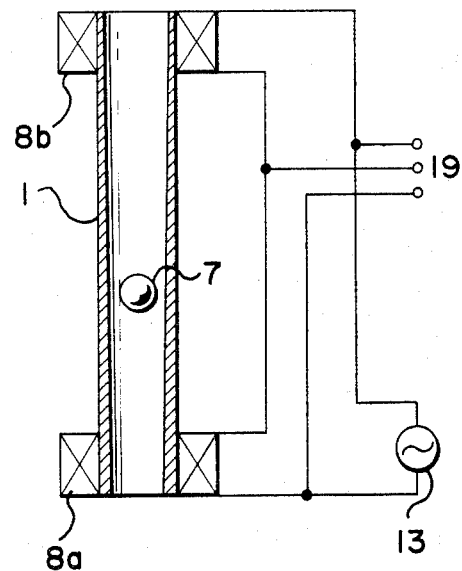
FIG. 21 is an elevational view diagrammatically illustrating a flow meter of the invention having two coils connected in series and wound around the tubular housing at upper and lower ends thereof, respectively.

FIG. 20 shows a further possible arrangement of the invention in which a coil 8 is provided only at a lowermost position of the tubular housing 1 defining the tapered flow chamber 6 therein and is energized by an oscillator or AC source 13. The flow responsive member 7 was a spherical ball containing 65% ferrite and the remainder a synthetic resin and the source 13 had a frequency of 5 MHz. It was found that the position of the flow member 7 up to a vertical distance of 15 cm away from that lowermost position could be measured by a voltmeter 19. As shown in FIG. 21, when two coils 8a and 8b connected in series are provided at a lowermost and uppermost positions, respectively, it has been found that the distance which can be measured increases to 30 cm.

Figure 22:
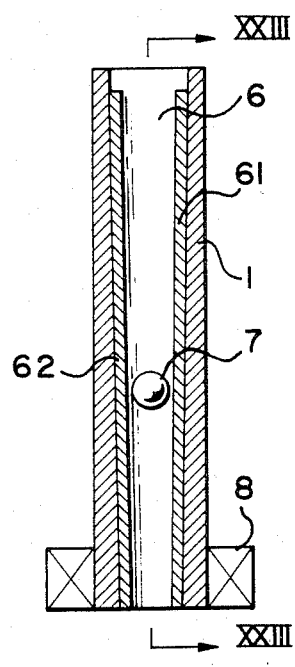
FIG. 22 is a sectional view in elevation diagrammatically illustrating a structure of the flow meter of FIG. 20 incorporating electromagnetically conductive strips attached on the inner wall of the tubular housing to extend longitudinally thereof.
Figure 23:
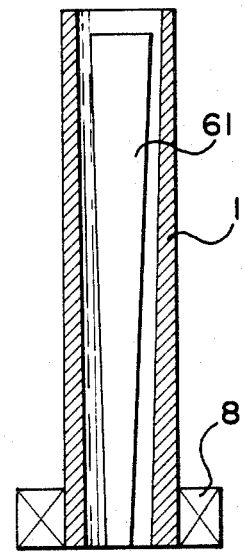
FIG. 23 is an elevational view in section illustrating the structure of FIG. 22 taken along the line XXIII—XXIII therein.

In FIGS. 22 and 23 there is shown a further preferred arrangement of a tapered flow chamber 6 wherein a pair of thin elongate elements 61 and 62 composed of a high magnetic-permeability material, e.g. permalloy, are attached on the inner wall of the cylindrical tubular housing 1 so that they are juxtaposed with each other across the vertical path of the fluid responsive member 7 in the flow chamber 6. Preferably, as shown, each of the elements 61 and 62 as attached has its width progressively increasing upwards. This arrangement has been found to increase the upper limit of position which can be measured when the coil 8 is provided only at the lowermost position of the flow chamber 6.

What is claimed is:

1. A device for measuring mass flow rate of a fluid, comprising:

an upright tubular housing having a cylindrical out periphery and an upwardly diverging tapered frustoconical flow chamber for accommodating a fluid;
an inlet fitting at a lower end of said housing for introducing said fluid to said chamber at a lower end thereof;
an outlet fitting at an upper end of said housing for discharging fluid from an upper end of said flow chamber whereby said fluid flows through said flow chamber vertically upward;
a fluid-responsive solid member constituted by a high-magnetic-permeability ferrite spherical ball coated with a uniform layer of at least one substance selected from the group which consists of synthetic resin, ceramic and carbon, said member being disposed movably within said flow chamber and propellable upwardly against gravity by the upwardly flowing fluid to a level substantially linearly dependent on the rate of flow of said fluid through said flow chamber;
a multi-turn electrical coil on said cylindrical periphery of said housing and having an interturn pitch progressively decreasing from said lower end of said housing to said upper end thereof;
a periodic power supply having a high frequency output connected across said coil; and
circuit means responsive to the effective inductance of said coil coupled thereto for indicating the rate of flow of said fluid through said chamber.

2. A device for measuring mass flow rate of a fluid, comprising:
an upright tubular housing having a cylindrical outer periphery and an upwardly diverging tapered frustoconical flow chamber for accommodating a fluid;
an inlet fitting at a lower end of said housing for introducing said fluid to said chamber at a lower end thereof;
an outlet fitting at an upper end of said housing for discharging fluid from an upper end of said flow chamber whereby said fluid flows through said flow chamber vertically upward;
an electomagnetically susceptible fluid-responsive solid member disposed movably within said flow chamber and propellable upwardly against gravity by the upwardly flowing fluid to a level substantially linearly dependent on the rate of flow of said fluid through said flow chamber, said member comprising a ferrite and at least one substance selected from the group which consists of synthetic resin, ceramic and carbon;
a multi-turn electrical coil on said cylindrical periphery of said housing and having an interturn pitch progressively decreasing from said lower end of said housing to said upper end thereof;
a periodic power supply having a high frequency output connected across said coil; and
circuit means responsive to the effective inductance of said coil coupled thereto for indicating the rate of flow of said fluid through said chamber, said member comprising an upper portion substantially constituted by a circular disk and a lower portion constituted at its upper part by a cylinder and at its lower part by a substantially downwardly pointed cone contiguous to said cylinder.

3. The device defined in claim 2 wherein said member further comprises an intermediate portion lying betwen said upper and lower portions and in the form of a generally downwardly convergent truncated cone.

* * * * *